US012190829B2

(12) United States Patent
Kim et al.

(10) Patent No.: US 12,190,829 B2
(45) Date of Patent: Jan. 7, 2025

(54) ORGANIC LIGHT EMITTING DIODE DISPLAY DEVICE INCLUDING SELECTING UNIT AND METHOD OF DRIVING THE SAME

(71) Applicant: LG Display Co., Ltd., Seoul (KR)

(72) Inventors: Joon-Ki Kim, Paju-si (KR); Ji-Eun Lee, Paju-si (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 18/062,516

(22) Filed: Dec. 6, 2022

(65) Prior Publication Data

US 2023/0206863 A1 Jun. 29, 2023

(30) Foreign Application Priority Data

Dec. 24, 2021 (KR) ........................ 10-2021-0187520

(51) Int. Cl.
*G09G 3/3291* (2016.01)
*G09G 3/3225* (2016.01)
*G09G 3/3233* (2016.01)
*G09G 3/3266* (2016.01)

(52) U.S. Cl.
CPC ......... *G09G 3/3291* (2013.01); *G09G 3/3225* (2013.01); *G09G 3/3233* (2013.01); *G09G 3/3266* (2013.01); *G09G 2300/0842* (2013.01); *G09G 2310/027* (2013.01); *G09G 2310/0278* (2013.01); *G09G 2310/08* (2013.01); *G09G 2320/0233* (2013.01)

(58) Field of Classification Search
CPC ......... G09G 2310/0251; G09G 3/3233; G09G 3/3266; G09G 3/3275; G09G 3/3291; G09G 2310/08; G09G 2310/0278; G09G 2310/027; G09G 2310/0264
See application file for complete search history.

(56) References Cited

U.S. PATENT DOCUMENTS

| | | | | |
|---|---|---|---|---|
| 11,017,730 B2 * | 5/2021 | Hwang | ................ | G09G 3/3266 |
| 11,037,493 B2 * | 6/2021 | Chang | .................. | G09G 3/3275 |
| 11,380,254 B2 * | 7/2022 | Kim | ...................... | G09G 3/3275 |
| 11,869,447 B2 * | 1/2024 | Yoo | ...................... | G09G 3/3233 |
| 2013/0162617 A1 * | 6/2013 | Yoon | .................... | G09G 3/3291 345/76 |

(Continued)

FOREIGN PATENT DOCUMENTS

| | | |
|---|---|---|
| KR | 10-2017-0030153 A | 3/2017 |
| KR | 10-2020-0005695 A | 1/2020 |
| KR | 10-2020-0070868 A | 6/2020 |

*Primary Examiner* — Dismery Mercedes
(74) *Attorney, Agent, or Firm* — Seed IP Law Group LLP

(57) ABSTRACT

An organic light emitting diode display device includes: a timing controlling unit generating an image data, a data control signal and a gate control signal; a data driving unit generating a data voltage using the image data and the data control signal and including an output channel outputting one of the data voltage and a pre-charge voltage; a gate driving unit generating a gate1 voltage, a gate2 voltage, a gate3 voltage, an emission1 voltage and an emission2 voltage using the gate control signal; a display panel including a subpixel, a gate line, a data line and a reset line, the subpixel including first to seventh transistors, a storage capacitor and a light emitting diode; and a selecting unit connecting the output channel to one of the data line and the reset line.

10 Claims, 14 Drawing Sheets

(56) References Cited

U.S. PATENT DOCUMENTS

| | | | | |
|---|---|---|---|---|
| 2015/0035734 | A1* | 2/2015 | Lee | G09G 3/3258 345/76 |
| 2015/0138183 | A1* | 5/2015 | Kishi | G09G 3/3266 345/82 |
| 2016/0071445 | A1* | 3/2016 | Kim | G09G 3/3291 345/212 |
| 2017/0004764 | A1* | 1/2017 | Kim | G09G 3/3233 |
| 2019/0371240 | A1* | 12/2019 | Mitani | G09G 3/3291 |
| 2020/0118487 | A1* | 4/2020 | Kim | G09G 3/3275 |
| 2020/0184893 | A1* | 6/2020 | Dong | G09G 3/3233 |
| 2022/0284860 | A1* | 9/2022 | Lin | G09G 3/3266 |

* cited by examiner

ORGANIC LIGHT EMITTING DIODE DISPLAY DEVICE INCLUDING SELECTING UNIT AND METHOD OF DRIVING THE SAME

CROSS REFERENCE TO RELATED APPLICATIONS

The present application claims the priority benefit of Republic of Korea Patent Application No. 10-2021-0187520 filed in Republic of Korea on Dec. 24, 2021, which is hereby incorporated by reference herein in its entirety.

BACKGROUND

Technical Field

The present disclosure relates to an organic light emitting diode display device, and more particularly, to an organic light emitting diode display device including a selecting unit where deterioration of a light emitting diode and a sampling transistor is compensated by selectively connecting a data driving unit and a subpixel using the selecting unit and a method of driving the organic light emitting diode display device.

Description of the Related Art

Recently, with the advent of an information-oriented society and as the interest in information displays for processing and displaying a massive amount of information and the demand for portable information media have increased, a display field has rapidly advanced. Thus, various light and thin flat panel display devices have been developed and highlighted.

Among the various flat panel display devices, an organic light emitting diode (OLED) display device is an emissive type device and does not include a backlight unit used in a non-emissive type device such as a liquid crystal display (LCD) device. As a result, the OLED display device has advantages in a viewing angle, a contrast ratio and a power consumption to be applied to various fields.

The OLED display device includes a compensating unit of various structures for compensating deterioration such as a threshold voltage variation of a driving transistor.

BRIEF SUMMARY

The inventors have recognizes that when the OLED display device is applied to a flexible display device such as a foldable display device, a rollable display device and a bendable display device, a number of a partial driving of a display panel increases and a difference of deterioration degrees of light emitting diodes and sampling transistors of a part displaying an image and a part not displaying an image is generated. As a result, a displayed image has a stain and a uniformity of the displayed image is reduced.

The present disclosure is directed to an organic light emitting diode display device and a method of driving the organic light emitting diode display device, which among others substantially obviate one or more of the technical problems due to limitations and disadvantages of the related art.

An aspect of the present disclosure provides an organic light emitting display device including a selecting unit (or circuit) where deterioration of a light emitting diode and a sampling transistor is compensated by transmitting a signal from a data driving unit to a subpixel or from the subpixel to the data driving unit using the selecting unit and a method of driving the organic light emitting diode display device.

An aspect of the present disclosure provides an organic light emitting diode display device including a selecting unit where deterioration such as a stain is reduced and a uniformity of an image is improved by selectively detecting and compensating a property of a light emitting diode and a sampling transistor partially driven using the selecting unit and a method of driving the organic light emitting diode display device.

Additional features and advantages of the disclosure will be set forth in the description which follows, and in part will be apparent from the description, or may be learned by practice of the disclosure. These and other advantages of the disclosure will be realized and attained by the structure particularly pointed out in the written description hereof as well as the appended drawings.

In the present disclosure, as embodied and broadly described herein, an organic light emitting diode display device includes: a timing controlling unit generating an image data, a data control signal and a gate control signal; a data driving unit generating a data voltage using the image data and the data control signal and including an output channel outputting one of the data voltage and a pre-charge voltage; a gate driving unit generating a gate1 voltage, a gate2 voltage, a gate3 voltage, an emission1 voltage and an emission2 voltage using the gate control signal; a display panel including a subpixel, a gate line, a data line and a reset line, the subpixel including first to seventh transistors, a storage capacitor and a light emitting diode, the gate line transmitting the gate1 voltage the gate2 voltage, the gate3 voltage, the emission1 voltage and the emission2 voltage to the subpixel, and the reset line transmitting the pre-charge voltage to the subpixel; and a selecting unit connecting the output channel to one of the data line and the reset line.

In an aspect, a method of driving an organic light emitting diode display device includes: during a first time period of an emission compensation frame, transmitting a pre-charge voltage of a data driving unit to an anode of a light emitting diode of a subpixel of a display panel through a selecting unit; and during a second time period of the emission compensation frame, transmitting a voltage of the anode of the light emitting diode to an analog-digital converter of the data driving unit through the selecting unit.

It is to be understood that both the foregoing general description and the following detailed description are explanatory and are intended to provide further explanation of the disclosure.

BRIEF DESCRIPTION OF THE SEVERAL VIEWS OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION

Figure 1:
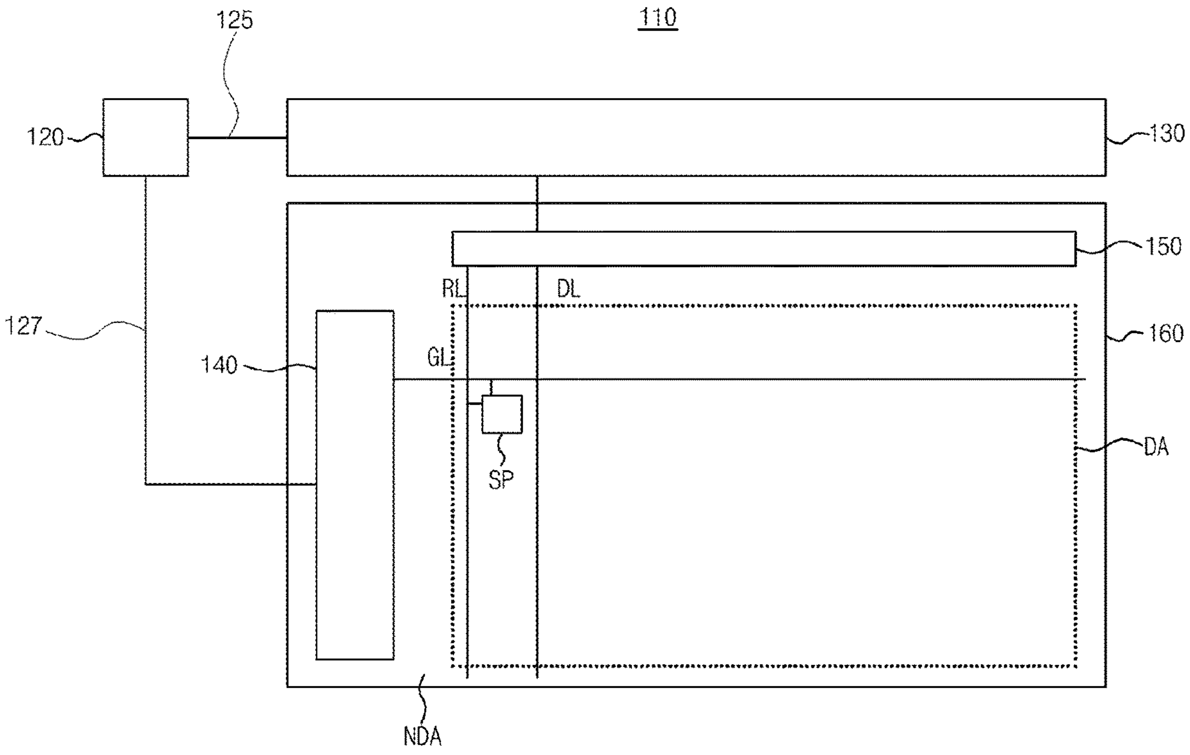
FIG. 1 is a view showing an organic light emitting diode display device according to an embodiment of the present disclosure.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to fully understand the scope of the present disclosure.

A shape, a size, a ratio, an angle, and a number disclosed in the drawings for describing embodiments of the present disclosure are merely an example. Thus, the present disclosure is not limited to the illustrated details. Like reference numerals refer to like elements throughout. In the following description, when the detailed description of the relevant known function or configuration is determined to unnecessarily obscure an important point of the present disclosure, the detailed description of such known function or configuration may be omitted. In a case where terms "comprise," "have," and "include" described in the present specification are used, another part may be added unless a more limiting term, such as "only," is used. The terms of a singular form may include plural forms unless referred to the contrary.

In construing an element, the element is construed as including an error or tolerance range even where no explicit description of such an error or tolerance range.

In describing a position relationship, when a position relation between two parts is described as, for example, "on," "over," "under," or "next," one or more other parts may be disposed between the two parts unless a more limiting term, such as "just" or "direct(ly)," is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term unit as used herein includes, a circuit, a functional block, a module in a circuit, or a system including one or more circuits or functional elements.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

Hereinafter, an organic light emitting diode display device including a selecting unit according to embodiments of the present disclosure will be described in detail with reference to the accompanying drawings. In the following description, like reference numerals designate like elements throughout. When a detailed description of well-known functions or configurations related to this document is determined to unnecessarily cloud a gist of the inventive concept, the detailed description thereof may be omitted or may be made brief.

FIG. 1 is a view showing an organic light emitting diode display device according to an embodiment of the present disclosure.

In FIG. 1, an organic light emitting diode (OLED) display device 110 according to an embodiment of the present disclosure includes a timing controlling unit 120, a data driving unit 130, a gate driving unit 140, a selecting unit 150 and a display panel 160. Each of the timing controlling unit 120, data driving unit 130, gate driving unit 140, and selecting unit 150 may comprise circuits or portions of circuits.

The timing controlling unit 120 generates an image data, a data control signal and a gate control signal using an image signal and a plurality of timing signals including a data enable signal, a horizontal synchronization signal, a vertical synchronization signal and a clock signal transmitted from an external system such as a graphic card or a television system. The image data and the data control signal are transmitted on line 125 to the data driving unit 130, and the gate control signal is transmitted to the gate driving unit 140 on line 127.

The data driving unit 130 generates a data voltage (data signal) using the data control signal and the image data transmitted to it from the timing controlling unit 120 and transmits the data voltage to a data line DL of the display panel 160.

The gate driving unit 140 generates a gate1 voltage (gate1 signal) Scan1 (of FIG. 2), a gate2 voltage (gate2 signal) Scan2 (of FIG. 2), a gate3 voltage (gate3 signal) Scan3 (of FIG. 2), an emission1 voltage (emission1 signal) Em1 (of FIG. 2) and an emission2 voltage (emission2 signal) Em2 (of FIG. 2) using the gate control signal transmitted on line 127 from the timing controlling unit 120 and applies the gate1 voltage Scan1, the gate2 voltage Scan2, the gate3 voltage Scan3, the emission1 voltage Em1 and the emission2 voltage Em2 to a gate line GL of the display panel 160. However, it is to be noted that, various gate voltages other than Scan 1, Scan2, Scan3 and various emission voltages other than Em1 and Em2 may be generated by the gate driving unit to drive the subpixel of the display device, and embodiments of the present disclosure are not limited thereto.

The gate driving unit 140 may have a gate in panel (GIP) type to be formed in a non-display area NDA of a substrate of the display panel 160 having the gate line GL, the data line DL and a subpixel SP.

The selecting unit 150 selectively connects the data driving unit 130 and the subpixel SP of the display panel 160. The detailed structure of the selecting unit 150 will be illustrated with reference to FIGS. 2 to 10.

The display panel 160 includes a display area DA at a central portion thereof and a non-display area NDA surrounding the display area DA. The display panel 160 displays an image using the gate voltage, the emission voltage and the data voltage. For displaying an image, the display panel 160 includes a plurality of subpixels SP, a plurality of gate lines GL and a plurality of data lines DL in the display area DA.

For example, the plurality of subpixels SP may include red, green and blue subpixels.

The gate line GL and the data line DL cross each other to define the subpixel SP, and the subpixel SP is connected to the gate line GL and the data line DL.

The data driving unit 130, the selecting unit 150 and the subpixel of the display panel 160 of the OLED display device 110 will be illustrated with reference to a drawing.

Figure 2:
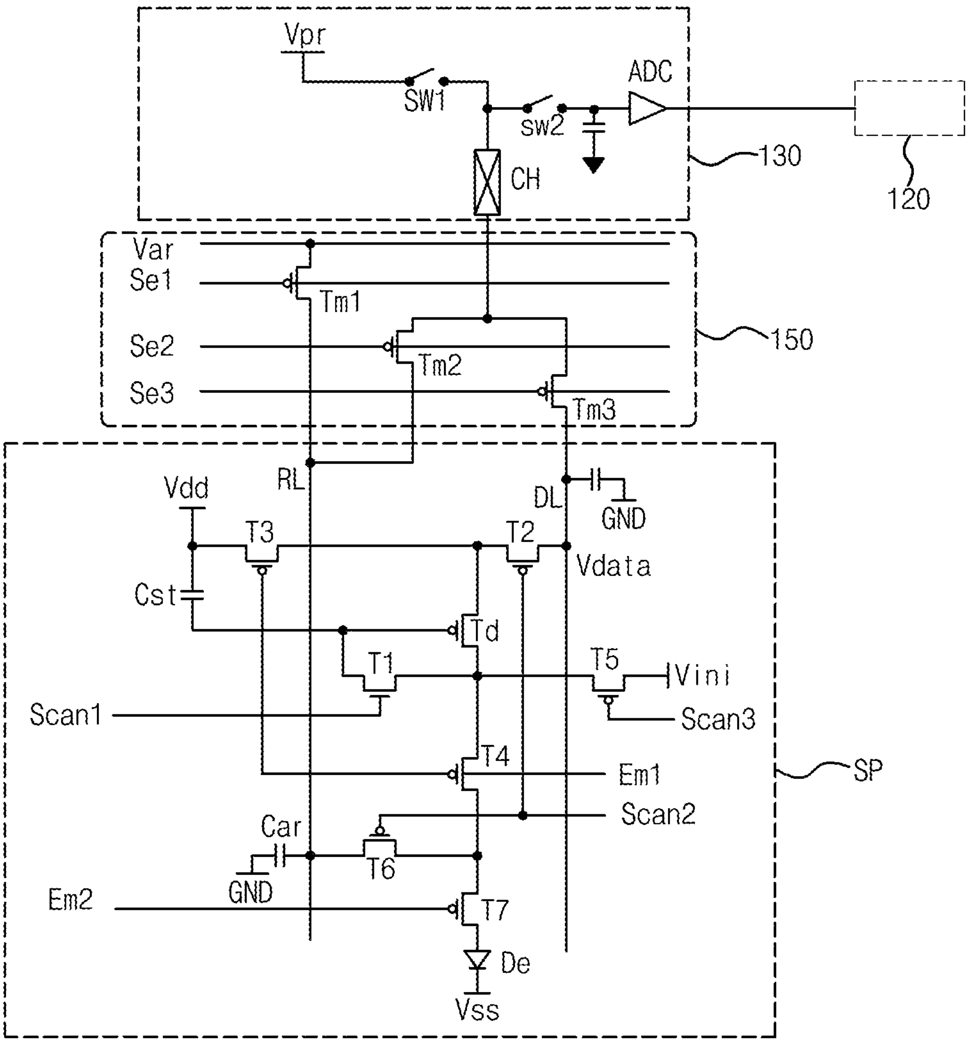
FIG. 2 is a circuit diagram showing a data driving unit, a selecting unit and a subpixel of an organic light emitting diode display device according to an embodiment of the present disclosure.

FIG. 2 is a circuit diagram showing a data driving unit, a selecting unit and a subpixel of an organic light emitting diode display device according to an embodiment of the present disclosure.

In FIG. 2, the OLED display device 110 according to an embodiment of the present disclosure includes the data driving unit 130, the selecting unit 150 and the subpixel SP.

The data driving unit 130 includes first and second switches SW1 and SW2, analog-digital converter ADC and an output channel CH.

The first switch SW1 is connected among a pre-charge voltage Vpr, the second switch SW2 and the output channel CH, and the second switch SW2 is connected among the first switch SW1, the analog-digital converter ADC and the output channel CH. For example, the first switch SW1 may be connected between the pre-charge voltage Vpr and the output channel CH, and the second switch SW2 may be connected between the analog-digital converter ADC and a common node of the first switch SW1 and the output channel CH, as shown in FIG. 2.

The analog-digital converter ADC is connected between the second switch SW2 and the timing controlling unit 120 (of FIG. 1), and the output channel CH is connected among the first and second switches SW1 and SW2 and the selecting unit 150.

The selecting unit 150 includes first, second and third mux transistors Tm1, Tm2 and Tm3.

The first mux transistor Tm1 is connected to a first selection signal Se1, an anode reset voltage Var and a reset line RL and switches a connection between the anode reset voltage Var and the reset line RL according to the first selection signal Se1.

The second mux transistor Tm2 is connected to a second selection signal Se2, the output channel CH and the reset line RL and switches a connection between the output channel CH and the reset line RL according to the second selection signal Se2.

The third mux transistor Tm3 is connected to a third selection signal Se3, the output channel CH and the data line DL and switches a connection between the output channel CH and the data line DL according to the third selection signal Se3.

The subpixel SP includes a driving transistor Td, first, second, third, fourth, fifth, sixth, and seventh transistors T1, T2, T3, T4, T5, T6, and T7 (also referred to as first to seventh transistors T1 to T7 for descriptive purposes), a storage capacitor Cst, an anode reset capacitor Car and a light emitting diode De.

For example, the driving transistor Td and the second to seventh transistors T2 to T7 may be a polycrystalline silicon thin film transistor (TFT) of a positive type, and the first transistor T1 may be an oxide semiconductor TFT of a negative type.

The driving transistor Td is switched (turned on and off) according to a voltage of a first electrode of the storage capacitor Cst. A gate electrode of the driving transistor Td is connected to the first electrode of the storage capacitor Cst and a drain electrode of the first transistor T1, a source electrode of the driving transistor Td is connected to a drain electrode of the second transistor T2 and a source electrode of the third transistor T3, and a drain electrode of the driving transistor Td is connected to a source electrode of the first transistor T1, a source electrode of the fourth transistor T4 and a drain electrode of the fifth transistor T5.

The first transistor T1 as a sampling transistor is switched according to a gate1 voltage Scan1. A gate electrode of the first transistor T1 is connected to the gate1 voltage Scan1, the source electrode of the first transistor T1 is connected to the drain electrode of the driving transistor Td, the source electrode of the fourth transistor T4 and a drain electrode of the fifth transistor T5, and the drain electrode of the first transistor T1 is connected to the first electrode of the storage capacitor Cst and the gate electrode of the driving transistor Td.

The second transistor T2 as a switching transistor is switched according to a gate2 voltage Scan2. A gate electrode of the second transistor T2 is connected to the gate2 voltage Scan2, a source electrode of the second transistor T2 is connected to the data line DL (data voltage Vdata), and the drain electrode of the second transistor T2 is connected to the source electrode of the driving transistor Td and the source electrode of the third transistor T3.

The third transistor T3 is switched according to an emission1 voltage Em1. A gate electrode of the third transistor T3 is connected to the emission1 voltage Em1, the source electrode of the third transistor T3 is connected to the source electrode of the driving transistor Td and the drain electrode of the second transistor T2, and a drain electrode of the third transistor T3 is connected to a high level voltage Vdd and a second electrode of the storage capacitor Cst.

The fourth transistor T4 as an emission transistor is switched according to the emission1 voltage Em1. A gate electrode of the fourth transistor T4 is connected to the emission1 voltage Em1, the source electrode of the fourth transistor T4 is connected the drain electrode of the driving transistor Td, the source electrode of the first transistor T1 and the drain electrode of the fifth transistor T5, and a drain electrode of the fourth transistor T4 is connected to a source electrode of the sixth transistor T6 and a source electrode of the seventh transistor T7.

The fifth transistor T5 is switched according to a gate3 voltage Scan3. A gate electrode of the fifth transistor T5 is connected to the gate3 voltage Scan3, a source electrode of the fifth transistor T5 is connected to an initial voltage Vini, and the drain electrode of the fifth transistor T5 is connected to the drain electrode of the driving transistor Td, the source electrode of the first transistor T1 and the source electrode of the fourth transistor T4.

The sixth transistor T6 is switched according to the gate2 voltage Scan2. A gate electrode of the sixth transistor T6 is connected to the gate2 voltage Scan2, the source electrode of the sixth transistor T6 is connected to the drain electrode of the fourth transistor T4 and the source electrode of the seventh transistor T7, and a drain electrode of the sixth transistor T6 is connected to the reset line RL (reset voltage Var) and a first electrode of the anode reset capacitor Car.

The seventh transistor T7 as an emission transistor is switched according to the emisson2 voltage Scan2. A gate electrode of the seventh transistor T7 is connected to the emission2 voltage Scan2, the source electrode of the seventh transistor T7 is connected to the drain electrode of the fourth transistor T4 and the source electrode of the sixth transistor T6, and a drain electrode of the seventh transistor T7 is connected to an anode of the light emitting diode De.

The storage capacitor Cst stores the data voltage Vdata and a threshold voltage Vtht of the driving transistor Td. The first electrode of the storage capacitor Cst is connected to the gate electrode of the driving transistor Td and the drain electrode of the first transistor T1, and the second electrode of the storage capacitor Cst is connected to the drain electrode of the third transistor T3 and the high level voltage Vdd.

The anode reset capacitor Car stores the anode reset voltage Var. The first electrode of the anode reset capacitor Car is connected to the reset line RL (reset voltage Var) and the drain electrode of the sixth transistor T6, and a second electrode of the anode reset capacitor Car is connected to a ground voltage GND.

The light emitting diode De is connected between the seventh transistor T7 and a low level voltage Vss and emits a light of a luminance proportional to a current of the driving transistor Td. The anode of the light emitting diode De is connected to the drain electrode of the seventh transistor T7, and a cathode of the light emitting diode De is connected to the low level voltage Vss.

In the OLED display device 110 according to an embodiment of the present disclosure, the selecting unit 150 transmits the pre-charge voltage Vpr to the reset line RL and transmits a threshold voltage Vthd of the light emitting diode De to the analog-digital converter ADC to compensate deterioration of the light emitting diode De.

Figure 3:
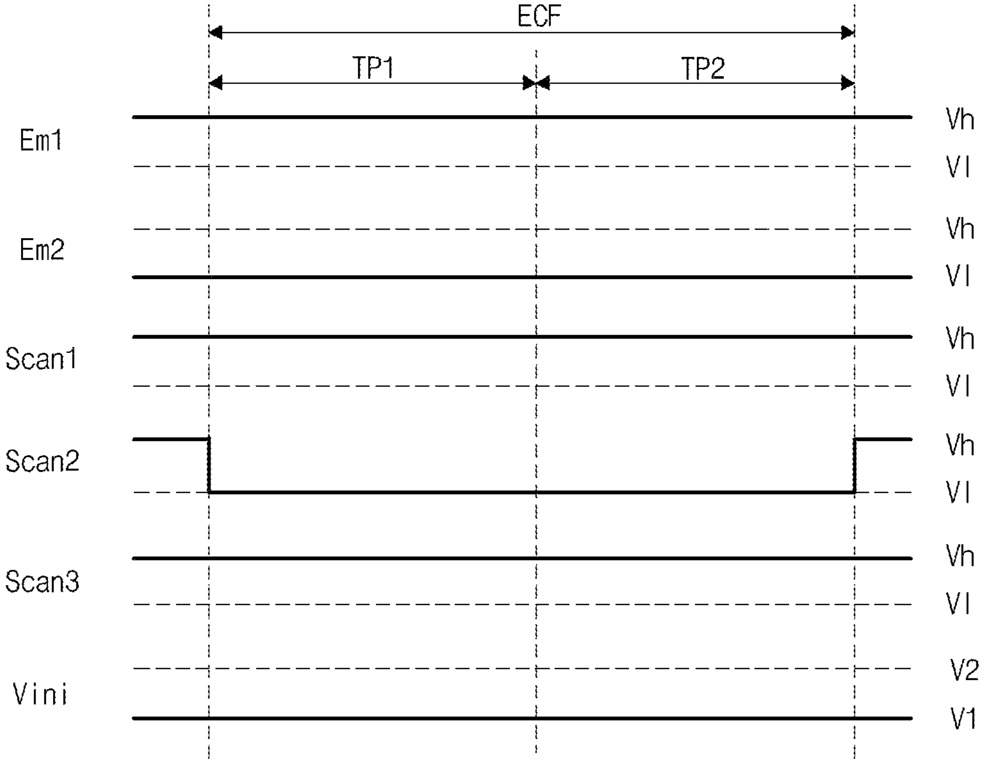
FIG. 3 is a view showing a plurality of signals of an emission compensation frame of an organic light emitting diode display device according to an embodiment of the present disclosure.
Figure 4A:
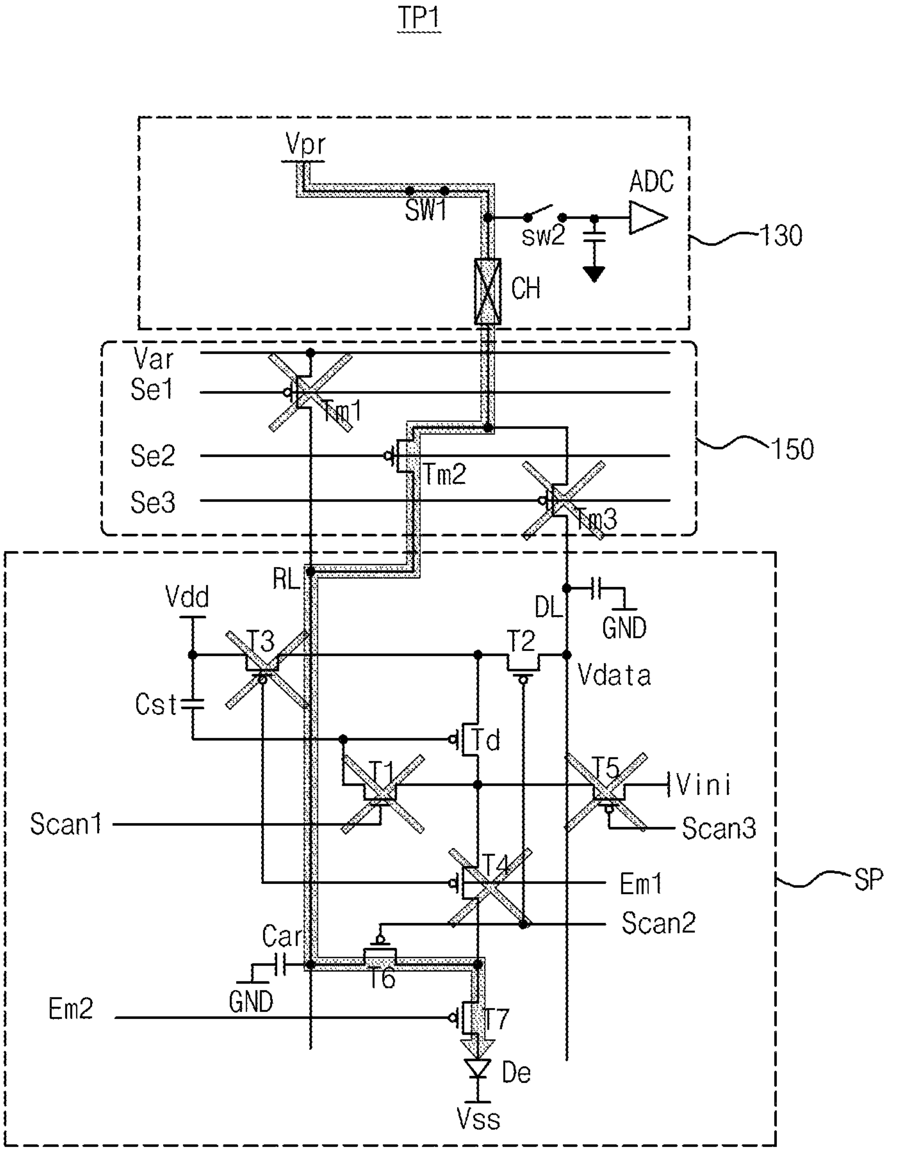
FIGS. 4A and 4B are views showing operation of first and second time periods, respectively, of an organic light emitting diode display device according to an embodiment of the present disclosure.
Figure 4B:
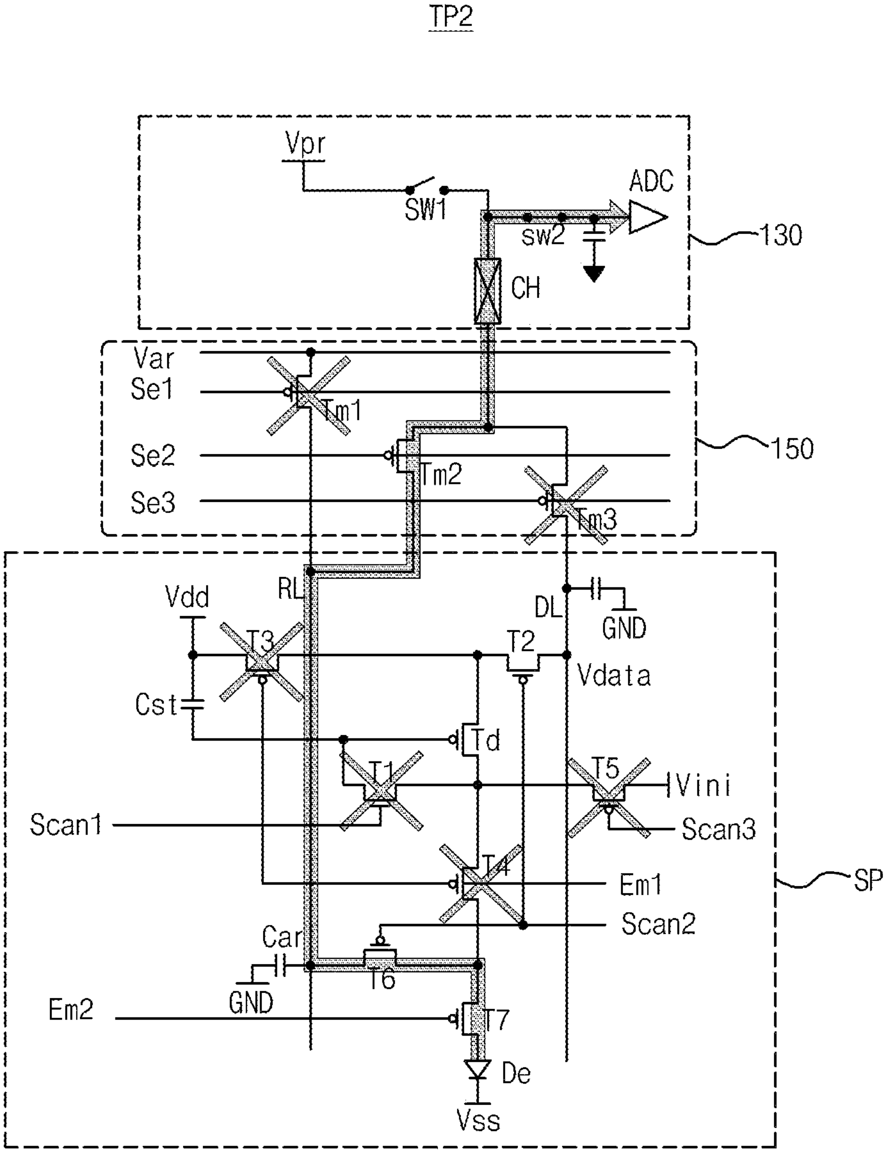
Figure 5A:
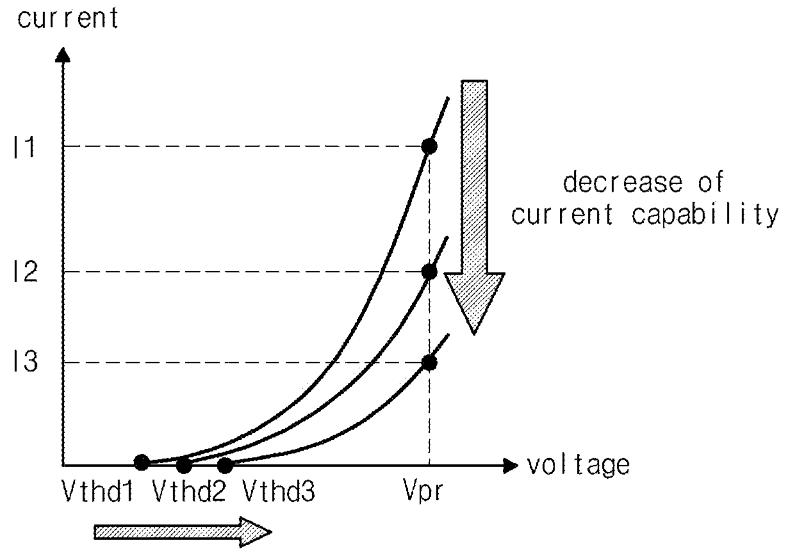
FIGS. 5A and 5B are views showing a threshold voltage variation of a light emitting diode of an organic light emitting diode display device according to an embodiment of the present disclosure.
Figure 5B:
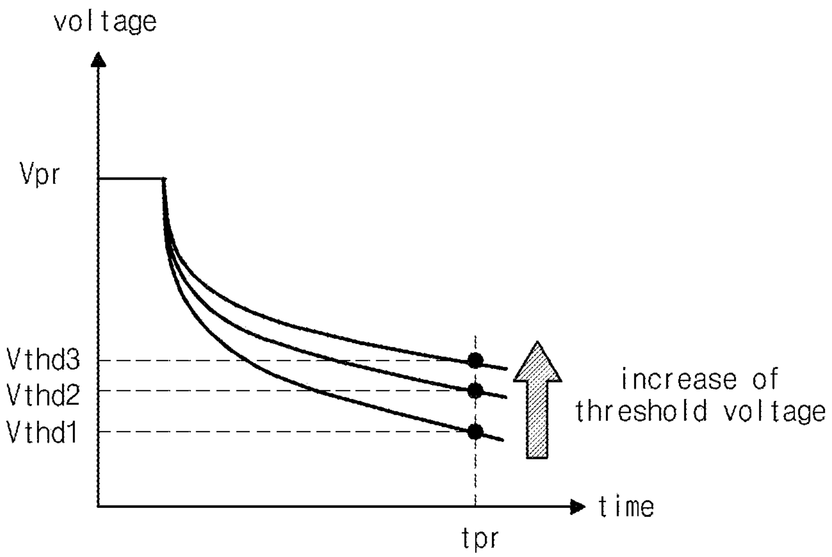

FIG. 3 is a view showing a plurality of signals of an emission compensation frame of an organic light emitting diode display device according to an embodiment of the present disclosure, FIGS. 4A and 4B are views showing operation of first and second time periods, respectively, of an organic light emitting diode display device according to an embodiment of the present disclosure, and FIGS. 5A and 5B are views showing a threshold voltage variation of a light emitting diode of an organic light emitting diode display device according to an embodiment of the present disclosure.

In FIG. 3, an emission compensation frame ECF for compensating the light emitting diode De includes a first time period TP1 where the pre-charge voltage Vpr is applied to the light emitting diode De and a second time period TP2 where the threshold voltage Vthd of the light emitting diode De is detected.

In FIGS. 3 and 4A, during the first time period TP1, the first switch SW1 of the data driving unit 130 has an on state and the second switch SW2 of the data driving unit 130 has an off state, and the pre-charge voltage Vpr is connected to the output channel CH.

The first and third selection signals Se1 and Se3 become a high level voltage, the second selection signal Se2 becomes a low level voltage, the first and third mux transistors Tm1 and Tm3 are turned off, and the second mux transistor Tm2 is turned on. The output channel CH of the data driving unit 130 is connected to the reset line RL of the subpixel SP.

The emission1 voltage Em1, the gate1 voltage Scan1 and the gate3 voltage Scan3 of the subpixel SP become a high level voltage Vh, the emission2 voltage Em2 and the gate2 voltage Scan2 of the subpixel SP become a low level voltage Vl, the first, third, fourth and fifth transistors T1, T3, T4 and T5 are turned off, and the second, sixth and seventh transistors T2, T6 and T7 are turned on. Further, the initial voltage Vini becomes a first voltage V1.

Accordingly, the pre-charge voltage Vpr of the data driving unit 130 is transmitted to the anode of the light emitting diode De of the subpixel SP.

In FIGS. 3 and 4B, during the second time period TP2, the first switch SW1 of the data driving unit 130 has an off state, the second switch SW2 of the data driving unit 130 has an on state, and the analog-digital converter ADC is connected to the output channel CH.

The first and third selection signals Se1 and Se3 of the selecting unit 150 become a high level voltage, the second selection signal Se2 of the selecting unit 150 becomes a low level voltage, the first and third mux transistors Tm1 and Tm3 are turned off, and the second mux transistor Tm2 is turned on. The output channel CH of the data driving unit 130 is connected to the reset line RL of the subpixel SP.

The emission1 voltage Em1, the gate1 voltage Scan1 and the gate3 voltage Scan3 of the subpixel SP become a high level voltage Vh, the emission2 voltage Em2 and the gate2 voltage Scan2 of the subpixel SP become a low level voltage Vl, the first, third, fourth and fifth transistors T1, T3, T4 and T5 are turned off, and the second, sixth and seventh transistors T2, T6 and T7 are turned on. Further, the initial voltage Vini becomes a first voltage V1.

Accordingly, a voltage of the anode of the light emitting diode De is transmitted to the analog-digital converter ADC of the data driving unit 130.

The voltage at the anode of the light emitting diode De may be interpreted as the threshold voltage Vthd.

In FIG. 5A, when the light emitting diode De is charged by applying the pre-charge voltage Vpr to the anode of the light emitting diode De as during the first time period TP1, a current flows through the light emitting diode De at a voltage equal to or greater than the threshold voltage Vthd. As a usage time of the light emitting diode De increases, a current capability of the light emitting diode De decreases and the threshold voltage Vthd of the light emitting diode De increases.

For example, the current of the light emitting diode De may decrease from a first current I1 to a second current I2, and then to a third current I3, and the threshold voltage Vthd of the light emitting diode De may increase from a first threshold voltage Vthd1 to a second threshold voltage Vthd2, and then to a third threshold voltage Vthd3.

In FIG. 5B, when the light emitting diode De is discharged by stopping application of the pre-charge voltage Vpr to the light emitting diode De as during the second time period TP2, a current flows through the light emitting diode De until a voltage of the anode of the light emitting diode De becomes the threshold voltage Vthd (during a discharging time tpr) and then the light emitting diode De becomes an off state. As a usage time of the light emitting diode De increases, the threshold voltage Vthd of the light emitting diode De increases.

For example, the threshold voltage Vthd of the light emitting diode De may increase from the first threshold voltage Vthd1 to the second threshold voltage Vthd2, and then to the third threshold voltage Vthd3.

The pre-charge voltage Vpr is applied to the anode of the light emitting diode De during the first time period TP1, and the light emitting diode De is discharged and the voltage of the anode of the light emitting diode De becomes the threshold voltage Vthd during the second time period TP2.

For obtaining a sufficient application time of the pre-charge voltage Vpr and a sufficient discharging time tpr of the light emitting diode De, a sum of the first and second time periods TP1 and TP2 may be equal to or greater than 1000 times one horizontal period 1H for an image display, and each of the first and second time periods TP1 and TP2 may be within a range of about 40% to about 60% of the sum of the first and second time periods TP1 and TP2.

In the OLED display device 110 according to an embodiment of the present disclosure, the pre-charge voltage Vpr of the data driving unit 130 is applied to the anode of the light emitting diode De of the subpixel SP through the selecting unit 150 during the first time period TP1 of the emission compensation frame ECF, and the threshold voltage Vthd of the light emitting diode De is transmitted to the analog-digital converter ADC of the data driving unit 130 through the selecting unit 150 during the second time period TP2 of the emission compensation frame ECF.

Further, the analog-digital converter ADC of the data driving unit 130 converts the threshold voltage Vthd of an analog type into the threshold voltage Vthd of a digital type to output the threshold voltage Vthd of a digital type via line 125 to the timing controlling unit 120. The timing controlling unit 120 adjusts the image data based on the threshold voltage Vthd of the light emitting diode De to generate a compensated image data and outputs the compensated image data to the data driving unit 130. The data driving unit 130 generates a compensated data voltage Vdata using the compensated image data and applies the compensated data voltage Vdata to the data line DL of the display panel 160. The display panel 160 displays an image using the compensated data voltage Vdata.

As a result, deterioration such as a variation of the threshold voltage Vthd of the light emitting diode De is compensated, and a display quality of an image is improved. In addition, deterioration such as a stain is minimized, and a uniformity of an image is improved.

In the OLED display device 110 according to an embodiment of the present disclosure, the selecting unit 150 transmits the current of the driving transistor Td to the analog-digital converter ADC to compensate deterioration of the first transistor T1 of a sampling transistor.

Figure 6:
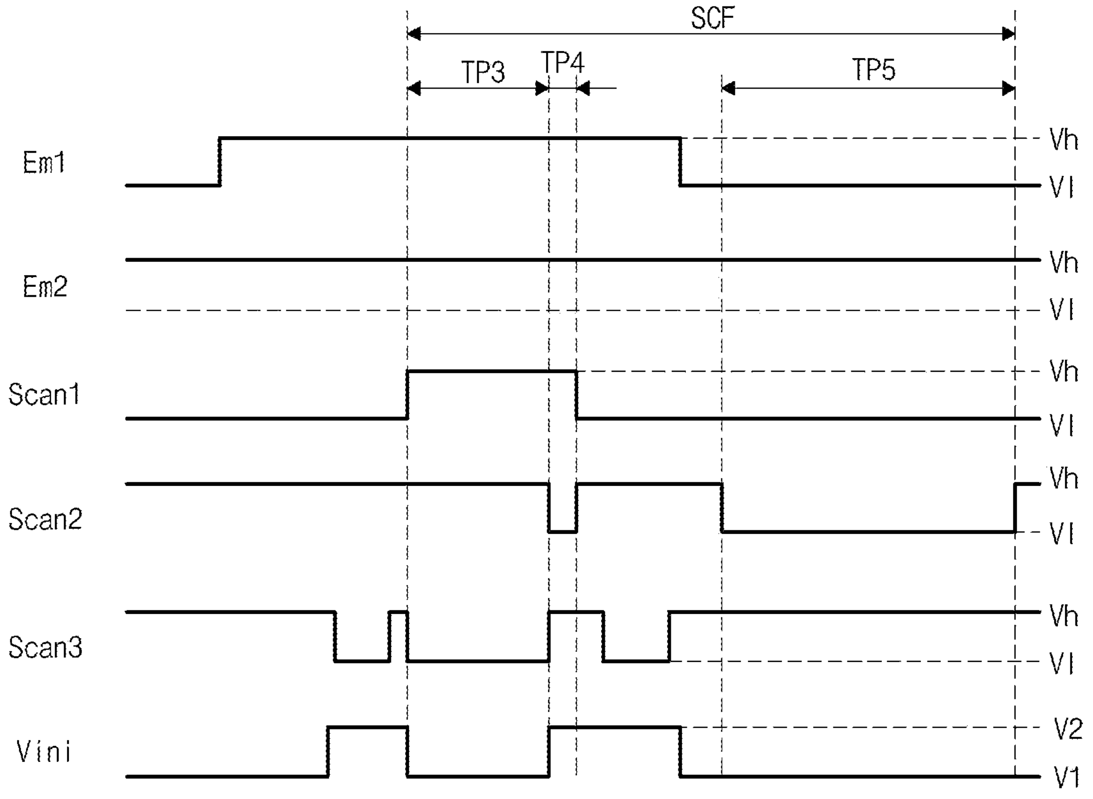
FIG. 6 is a view showing a plurality of signals of a sampling compensation frame of an organic light emitting diode display device according to an embodiment of the present disclosure.
Figure 7A:
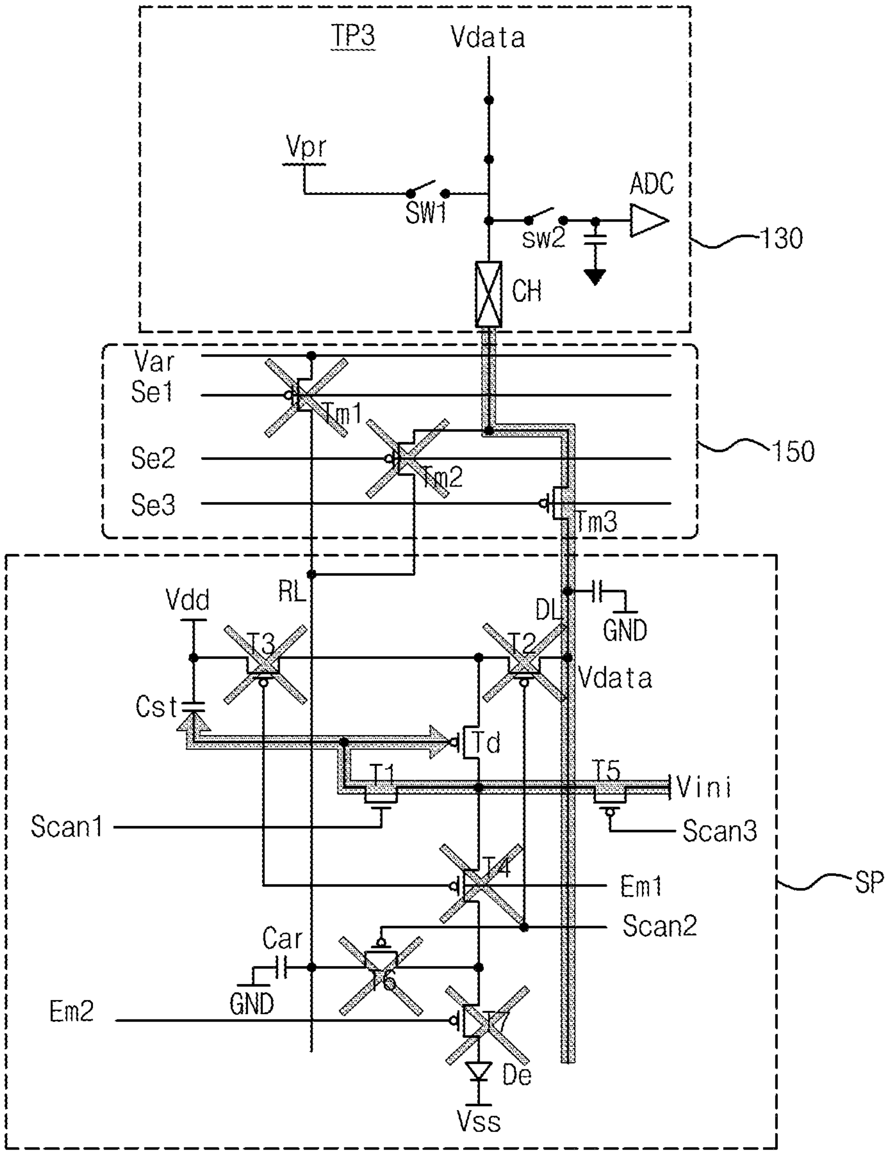
FIGS. 7A to 7C are views showing operation of third to fifth time periods, respectively, of an organic light emitting diode display device according to an embodiment of the present disclosure.
Figure 7B:
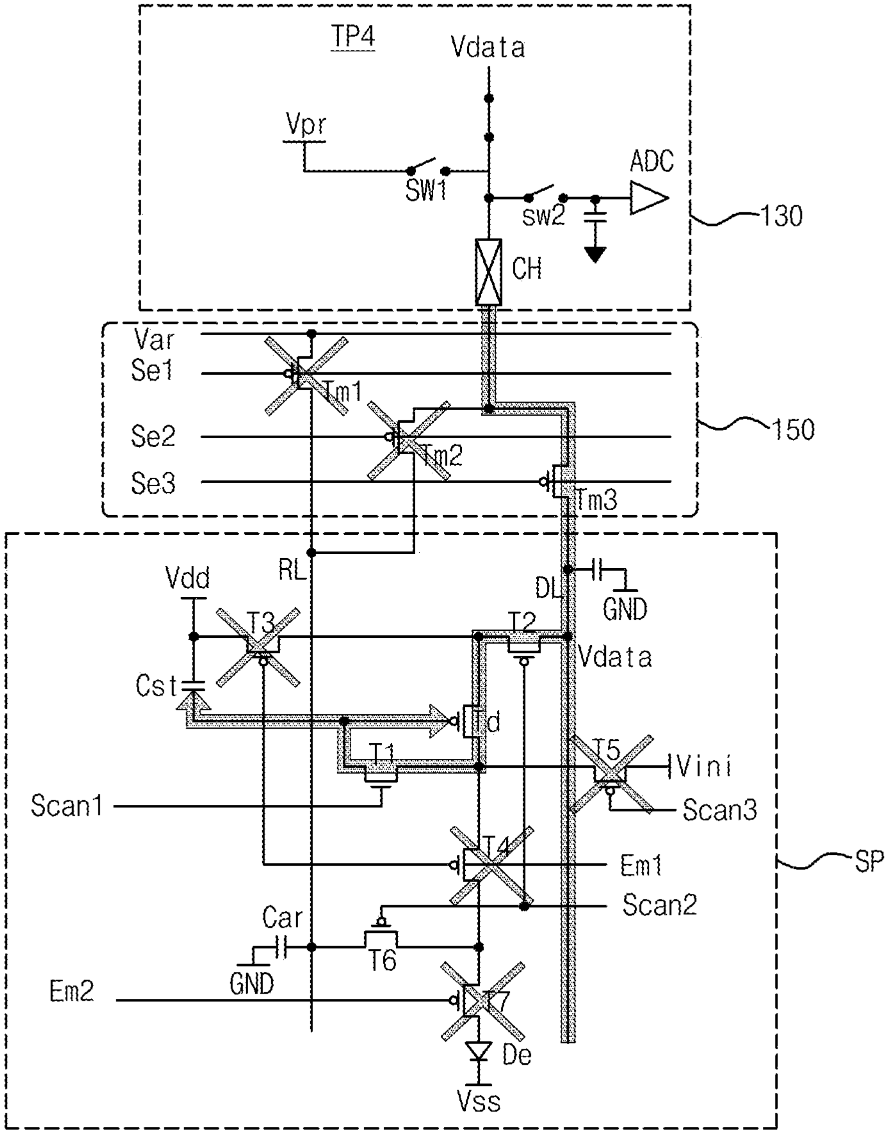
Figure 7C:
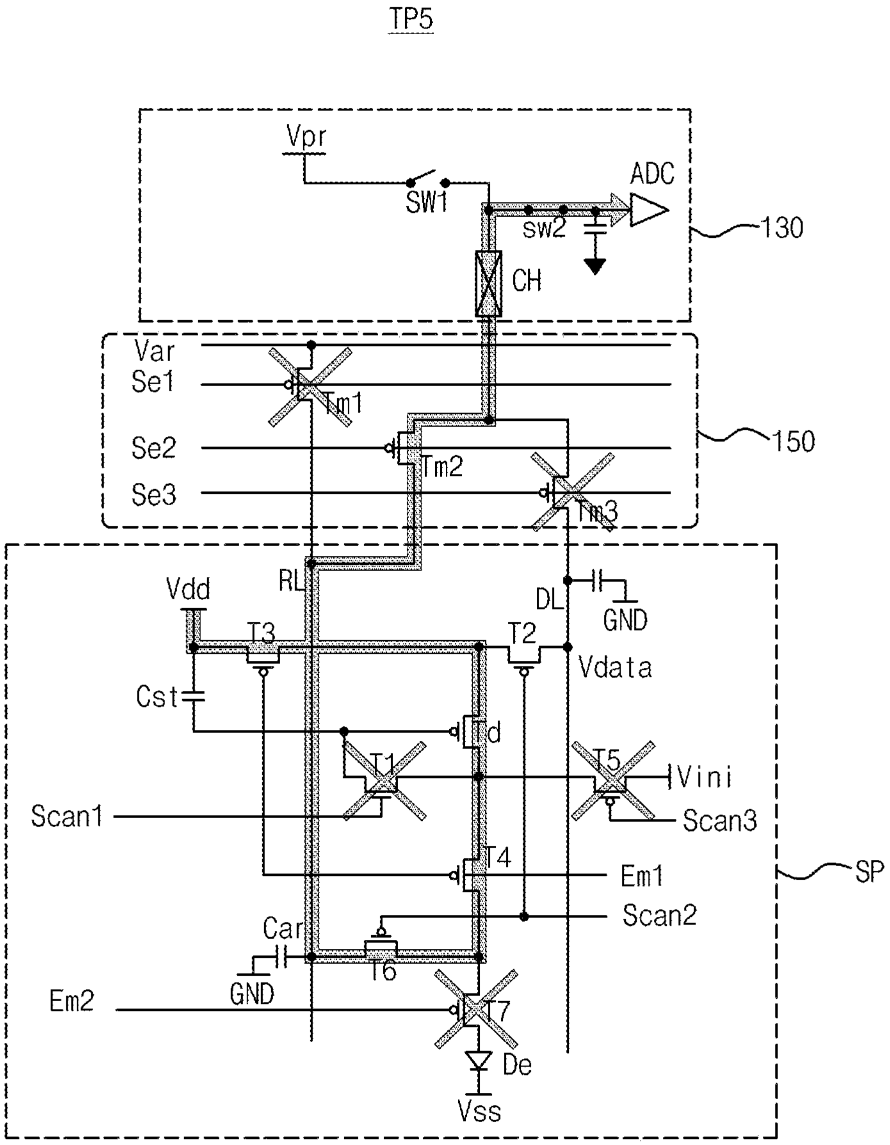

FIG. 6 is a view showing a plurality of signals of a sampling compensation frame of an organic light emitting diode display device according to an embodiment of the present disclosure, FIGS. 7A to 7C are views showing operation of third to fifth time periods, respectively, of an organic light emitting diode display device according to an embodiment of the present disclosure.

In FIG. 6, a sampling compensation frame SCF for compensating the first transistor T1 of a sampling transistor includes a third time period TP3 where the initial voltage Vini is applied to the gate electrode of the driving transistor Td, a fourth time period TP4 where the data voltage Vdata and the threshold voltage Vtht are applied to the gate electrode of the driving transistor Td and a fifth time period TP5 where the current of the driving transistor Td is detected.

In FIGS. 6 and 7A, during the third time period TP3, the first and second switches SW1 and SW2 of the data driving unit 130 have an off state, and the data voltage Vdata is connected to the output channel CH.

The first and second selection signals Se1 and Se2 of the selecting unit 150 become a high level voltage, the third selection signal Se3 of the selecting unit 150 becomes a low level voltage, the first and second mux transistors Tm1 and Tm2 are turned off, and the third mux transistor Tm3 is turned on. The output channel CH of the data driving unit 130 is connected to the data line DL of the subpixel SP.

The emission1 voltage Em1, the emission2 voltage Em2, the gate1 voltage Scan1 and the gate2 voltage Scan2 of the subpixel SP become a high level voltage Vh, the gate3 voltage Scan3 of the subpixel SP becomes a low level voltage Vl, the first and fifth transistors T1 and T5 are turned on, and the second, third, fourth, sixth and seventh transistors T2, T3, T4, T6 and T7 are turned off. Further, the initial voltage Vini becomes a first voltage V1.

Accordingly, the data voltage Vdata of the data driving unit 130 is transmitted to the data line DL of the display panel 160 and the initial voltage Vini is applied to the gate electrode of the driving transistor Td and the first electrode of the storage capacitor Cst so that the gate electrode of the driving transistor Td and the first electrode of the storage capacitor Cst are initialized.

In FIGS. 6 and 7B, during the fourth time period TP4, the first and second switches SW1 and SW2 of the data driving unit 130 have an off state, and the data voltage Vdata is connected to the output channel CH.

The first and second selection signals Se1 and Se2 of the selecting unit 150 become a high level voltage, the third selection signal Se3 of the selecting unit 150 becomes a low level voltage, the first and second mux transistors Tm1 and Tm2 are turned off, and the third mux transistor Tm3 is turned on. The output channel CH of the data driving unit 130 is connected to the data line DL of the subpixel SP.

The emission1 voltage Em1, the emission2 voltage Em2, the gate1 voltage Scan1 and the gate3 voltage Scan3 of the subpixel SP become a high level voltage Vh, the gate2 voltage Scan2 of the subpixel SP becomes a low level voltage Vl, the first, second and sixth transistors T1, T2 and T6 are turned on, and the third, fourth, fifth and seventh transistors T3, T4, T5 and T7 are turned off. Further, the initial voltage Vini becomes a second voltage V2 greater than the first voltage V1.

Accordingly, a sum (Vdata+Vtht) of the data voltage Vdata and the threshold voltage Vtht of the driving transistor Td is applied to and stored in the gate electrode of the driving transistor Td and the first electrode of the storage capacitor Cst.

In FIGS. 6 and 7C, during the fifth time period TP5, the first switch SW1 of the data driving unit 130 has an off state, the second switch SW2 of the data driving unit 130 has an on state, and the analog-digital converter ADC is connected to the output channel CH.

The first and third selection signals Se1 and Se3 of the selecting unit 150 become a high level voltage, the second selection signal Se2 of the selecting unit 150 becomes a low level voltage, the first and third mux transistors Tm1 and Tm3 are turned off, and the second mux transistor Tm2 is turned on. The output channel CH of the data driving unit 130 is connected to the reset line RL of the subpixel SP.

The emission1 voltage Em1, the gate1 voltage Scan1 and the gate2 voltage Scan2 of the subpixel SP become a low level voltage Vl, the emission2 voltage Em2 and the gate3 voltage Scan3 of the subpixel SP become a high level voltage Vh, the first, fifth and seventh transistors T1, T5 and T7 are turned off, and the second, third, fourth and sixth transistors T2, T3, T4 and T6 are turned on. Further, the initial voltage Vini becomes the first voltage V1.

Accordingly, a current flows through the driving transistor Td turned on by the sum (Vdata+Vtht) of the data voltage Vdata and the threshold voltage Vtht of the driving transistor Td from the high level voltage Vdd, and the current of the driving transistor Td of the subpixel SP is transmitted to the analog-digital converter ADC of the data driving unit 130.

Here, the current of the driving transistor Td reflects deterioration such as property degradation of the first transistor T1 of a sampling transistor.

When the OLED display device 110 is driven for a relatively long time, an element property of the first transistor T1 may be deteriorated due to a voltage stress. When the element property of the first transistor T1 connected to the gate electrode and the drain electrode of the driving transistor Td is deteriorated, a current property of the driving transistor Td may be deteriorated.

For example, when the element property of the first transistor T1 is deteriorated, the current of the driving transistor Td may be reduced.

In the OLED display device 110 according to an embodiment of the present disclosure, the initial voltage Vini is applied to the first electrode of the storage capacitor Cst and the gate electrode of the driving transistor Td during the third time period TP3 of the sampling compensation frame SCF, the data voltage Vdata of the data driving unit 130 and the threshold voltage Vtht of the driving transistor Td are applied to the first electrode of the storage capacitor Cst and the gate electrode of the driving transistor Td of the subpixel SP through the selecting unit 150 during the fourth time period TP4 of the sampling compensation frame SCF, and the current of the driving transistor Td is transmitted to the analog-digital converter ADC of the data driving unit 130 through the selecting unit 150 during the fifth time period TP5 of the sampling compensation frame SCF.

Further, the analog-digital converter ADC of the data driving unit 130 converts the current of an analog type into the current of a digital type to output the current of a digital type to the timing controlling unit 120. The timing controlling unit 120 adjusts the image data based on the current of the driving transistor Td corresponding to a deterioration degree of the first transistor T1 as a sampling transistor to generate a compensated image data and outputs the compensated image data to the data driving unit 130. The data driving unit 130 generates a compensated data voltage Vdata using the compensated image data and applies the compensated data voltage Vdata to the data line DL of the display panel 160. The display panel 160 displays an image using the compensated data voltage Vdata.

As a result, deterioration such as deterioration of the element property of the first transistor T1 of a sampling transistor is compensated, and a display quality of an image is improved. In addition, deterioration such as a stain is minimized, and a uniformity of an image is improved.

In the OLED display device 110 according to an embodiment of the present disclosure, the selecting unit 150 transmits the data voltage Vdata to the driving transistor Td to compensate deterioration of the driving transistor Td and display an image.

Figure 8:
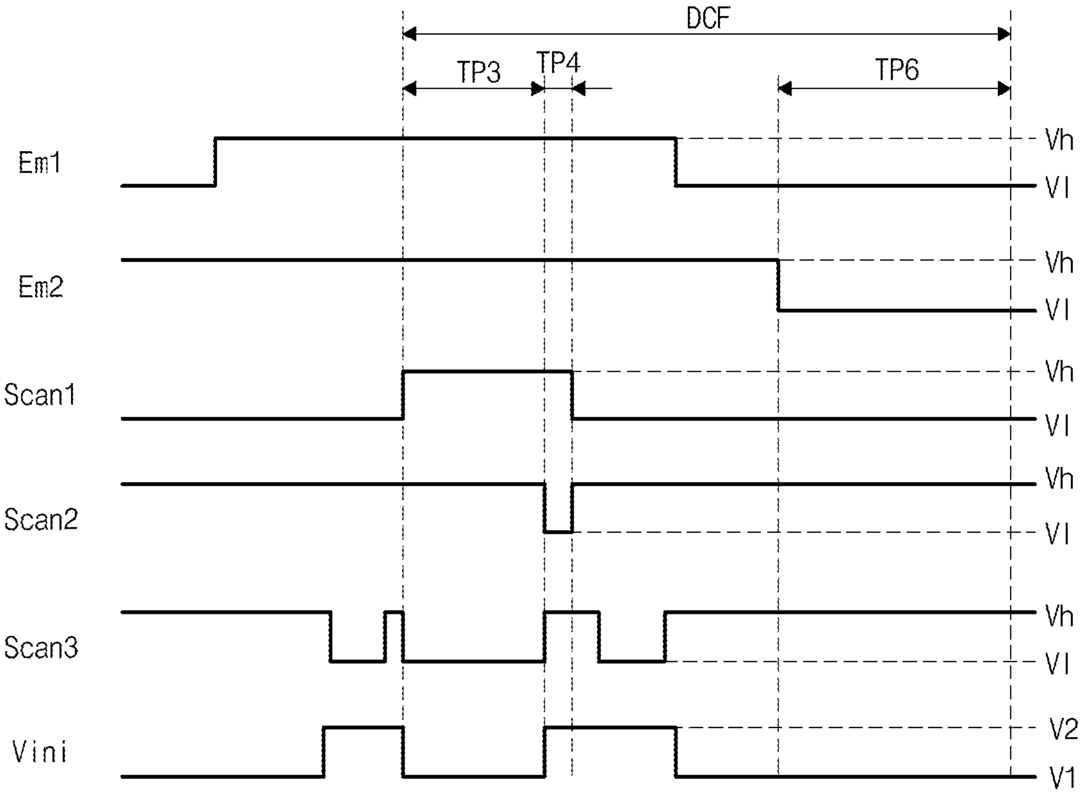
FIG. 8 is a view showing a plurality of signals of a driving compensation frame of an organic light emitting diode display device according to an embodiment of the present disclosure.
Figure 9:
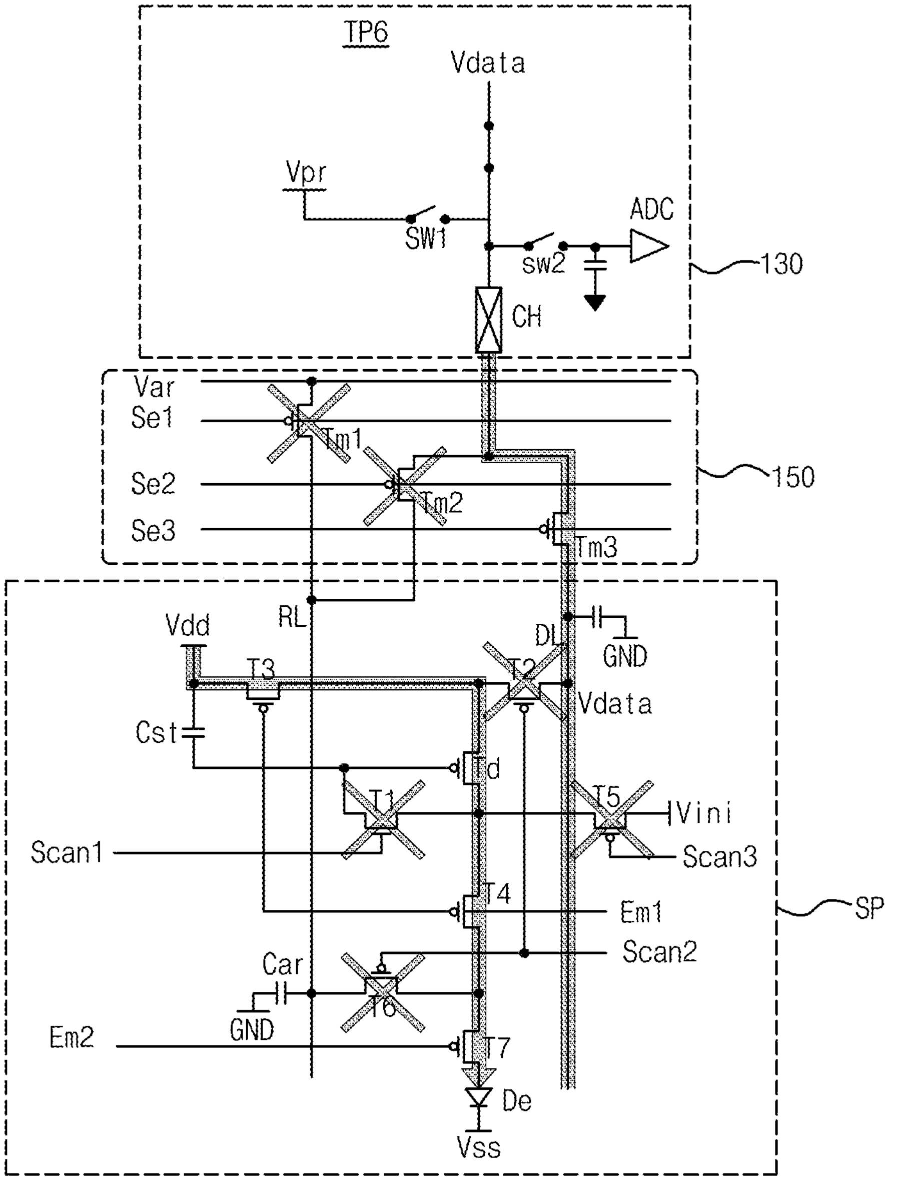
FIG. 9 is a view showing operation of a sixth time period of an organic light emitting diode display device according to an embodiment of the present disclosure.

FIG. 8 is a view showing a plurality of signals of a driving compensation frame of an organic light emitting diode display device according to an embodiment of the present disclosure, FIG. 9 is a view showing operation of a sixth time period of an organic light emitting diode display device according to an embodiment of the present disclosure.

In FIG. 8, a driving compensation frame DCF for compensating the driving transistor Td and displaying an image includes the third time period TP3 where the initial voltage Vini is applied to the gate electrode of the driving transistor Td, the fourth time period TP4 where the data voltage Vdata and the threshold voltage Vtht are applied to the gate electrode of the driving transistor Td and a sixth time period TP6 where the light emitting diode De emits a light.

The third and fourth time periods TP3 and TP4 of FIG. 8 are the same as the third and fourth time periods TP3 and TP4 of FIG. 6, the third and fourth time periods TP3 and TP4 will be illustrated with reference to FIGS. 7A and 7B.

In FIGS. 8 and 7A, during the third time period TP3, the first and second switches SW1 and SW2 of the data driving unit 130 have an off state, and the data voltage Vdata is connected to the output channel CH.

The first and second selection signals Se1 and Se2 of the selecting unit 150 become a high level voltage, the third selection signal Se3 of the selecting unit 150 becomes a low level voltage, the first and second mux transistors Tm1 and Tm2 are turned off, and the third mux transistor Tm3 is turned on. The output channel CH of the data driving unit 130 is connected to the data line DL of the subpixel SP.

The emission1 voltage Em1, the emission2 voltage Em2, the gate1 voltage Scan1 and the gate2 voltage Scan2 of the subpixel SP become a high level voltage Vh, the gate3 voltage Scan3 of the subpixel SP becomes a low level voltage Vl, the first and fifth transistors T1 and T5 are turned on, and the second, third, fourth, sixth and seventh transistors T2, T3, T4, T6 and T7 are turned off. Further, the initial voltage Vini becomes a first voltage V1.

Accordingly, the data voltage Vdata of the data driving unit 130 is transmitted to the data line DL of the display panel 160 and the initial voltage Vini is applied to the gate electrode of the driving transistor Td and the first electrode of the storage capacitor Cst so that the gate electrode of the driving transistor Td and the first electrode of the storage capacitor Cst are initialized.

In FIGS. 8 and 7B, during the fourth time period TP4, the first and second switches SW1 and SW2 of the data driving unit 130 have an off state, and the data voltage Vdata is connected to the output channel CH.

The first and second selection signals Se1 and Se2 of the selecting unit 150 become a high level voltage, the third selection signal Se3 of the selecting unit 150 becomes a low level voltage, the first and second mux transistors Tm1 and Tm2 are turned off, and the third mux transistor Tm3 is turned on. The output channel CH of the data driving unit 130 is connected to the data line DL of the subpixel SP.

The emission1 voltage Em1, the emission2 voltage Em2, the gate1 voltage Scan1 and the gate3 voltage Scan3 of the subpixel SP become a high level voltage Vh, the gate2 voltage Scan2 of the subpixel SP becomes a low level voltage Vl, the first, second and sixth transistors T1, T2 and T6 are turned on, and the third, fourth, fifth and seventh transistors T3, T4, T5 and T7 are turned off. Further, the initial voltage Vini becomes a second voltage V2 greater than the first voltage V1.

Accordingly, a sum (Vdata+Vtht) of the data voltage Vdata and the threshold voltage Vtht of the driving transistor Td is applied to and stored in the gate electrode of the driving transistor Td and the first electrode of the storage capacitor Cst.

In FIGS. 8 and 9, during the sixth time period TP6, the first and second switches SW1 and SW2 of the data driving unit 130 have an off state, and the data voltage Vdata is connected to the output channel CH.

The first and second selection signals Se1 and Se2 of the selecting unit 150 become a high level voltage, the third selection signal Se3 of the selecting unit 150 becomes a low level voltage, the first and second mux transistors Tm1 and Tm2 are turned off, and the third mux transistor Tm3 is turned on. The output channel CH of the data driving unit 130 is connected to the data line DL of the subpixel SP.

The emission1 voltage Em1, the emission2 voltage Em2 and the gate1 voltage Scan1 of the subpixel SP become a low level voltage Vl, the gate2 voltage Scan2 and the gate3 voltage Scan3 of the subpixel SP become a high level voltage Vh, the first, second, fifth and sixth transistors T1, T2, T5 and T6 are turned off, and the third, fourth and seventh transistors T3, T4 and T7 are turned on.

Accordingly, a current flows through the driving transistor Td turned on by the sum (Vdata+Vtht) of the data voltage Vdata and the threshold voltage Vtht of the driving transistor Td from the high level voltage Vdd, and the current of the driving transistor Td of the subpixel SP is transmitted to the light emitting diode De. As a result, the light emitting diode De emits a light to display an image.

Here, since the current of the driving transistor Td is proportional to a square of a value (Vgs−Vtht=Vdata+Vtht−Vdd−Vtht=Vdata−Vdd) obtained by subtracting the threshold voltage Vtht from a gate-source voltage Vgs, a factor corresponding to the threshold voltage Vtht is removed from the current of the driving transistor Td and deterioration such as a variation of the threshold voltage Vtht of the driving transistor Td is compensated.

In the OLED display device 110 according to an embodiment of the present disclosure, the initial voltage Vini is applied to the first electrode of the storage capacitor Cst and the gate electrode of the driving transistor Td during the third time period TP3 of the driving compensation frame DCF, the data voltage Vdata of the data driving unit 130 and the threshold voltage Vtht of the driving transistor Td are applied to the first electrode of the storage capacitor Cst and the gate electrode of the driving transistor Td of the subpixel SP through the selecting unit 150 during the fourth time period TP4 of the driving compensation frame DCF, and the light emitting diode De emits a light to display an image in a state where deterioration such as a variation of the threshold voltage Vtht of the driving transistor Td is compensated during the sixth time period TP6 of the driving compensation frame DCF.

As a result, deterioration such as a variation of the threshold voltage Vtht of the driving transistor Td is compensated, and a display quality of an image is improved. In addition, deterioration such as a stain is minimized, and a uniformity of an image is improved.

In the OLED display device 110 according to an embodiment of the present disclosure, the anode reset voltage Var is transmitted to the light emitting diode to reset the anode of the light emitting diode De.

Figure 10:
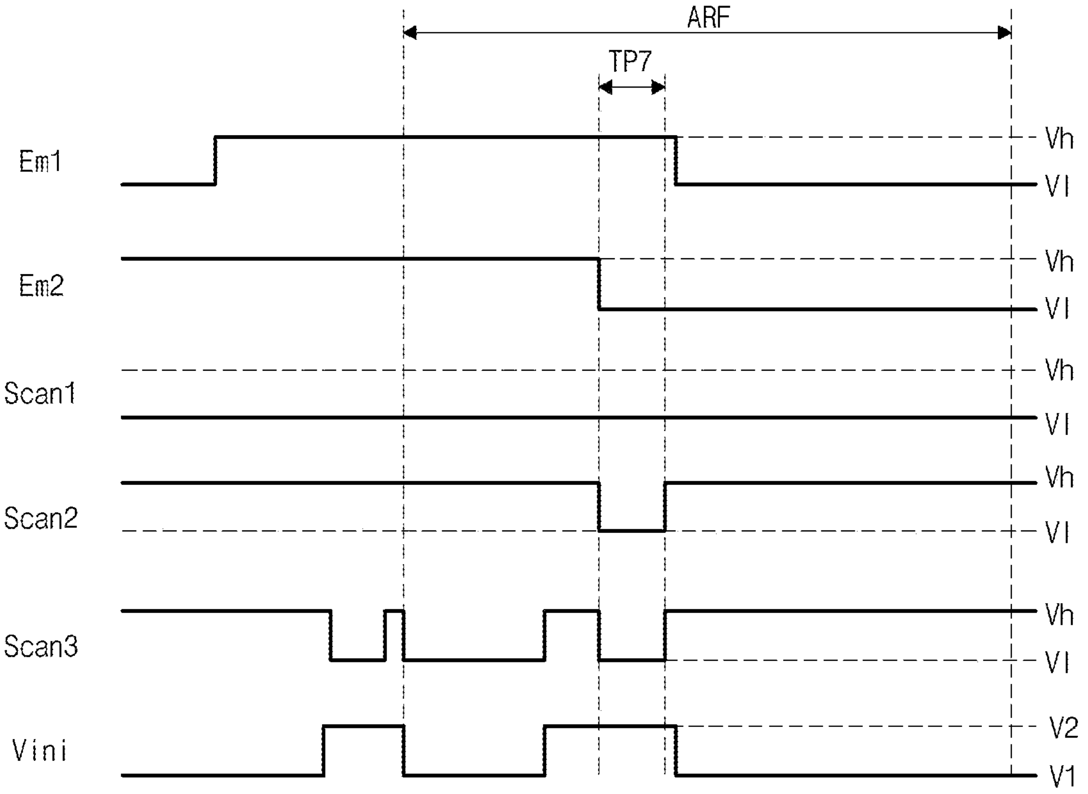
FIG. 10 is a view showing a plurality of signals of an anode reset frame of an organic light emitting diode display device according to an embodiment of the present disclosure.
Figure 11:
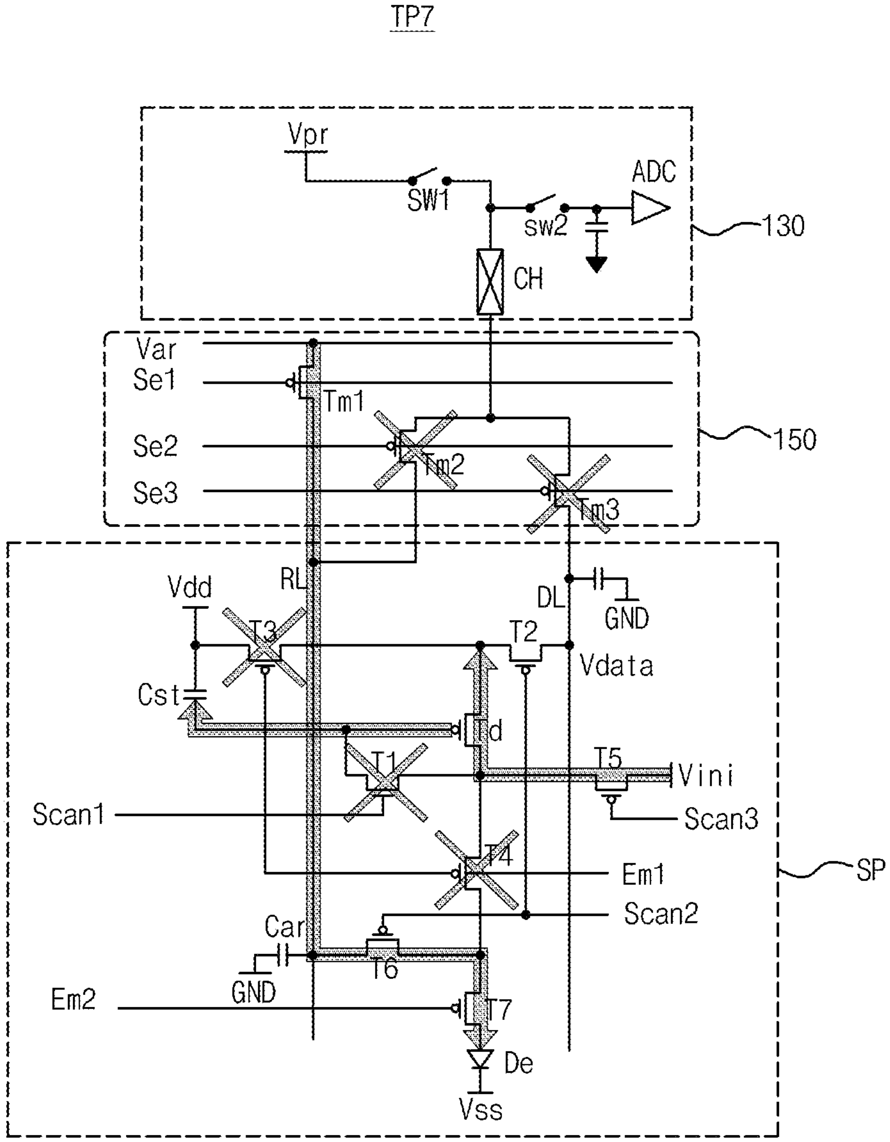
FIG. 11 is a view showing operation of a seventh time period of an organic light emitting diode display device according to an embodiment of the present disclosure.

FIG. 10 is a view showing a plurality of signals of an anode reset frame of an organic light emitting diode display device according to an embodiment of the present disclosure, FIG. 11 is a view showing operation of a seventh time period of an organic light emitting diode display device according to an embodiment of the present disclosure.

In FIG. 10, an anode reset frame ARF for resetting the anode of the light emitting diode De includes a seventh time period TP7 where the initial voltage Vini is applied to the drain electrode and the source electrode of the driving transistor Td and the anode reset voltage Var is applied to the anode of the light emitting diode De.

In FIGS. 10 and 11, during the seventh time period TP7, the first and second switches SW1 and SW2 of the data driving unit 130 have an off state.

The first selection signal Se1 of the selecting unit 150 becomes a low level voltage, the second and third selection signals Se2 and Se3 of the selecting unit 150 become a high level voltage, the first mux transistor Tm1 is turned on, and the second and third mux transistors Tm2 and Tm3 are turned off. The anode reset voltage Var is connected to the reset line RL of the subpixel SP.

The emission1 voltage Em1 become a high level voltage Vh and the emission2 voltage Em2, the gate1 voltage Scan1, the gate2 voltage Scan2 and the gate3 voltage Scan3 of the subpixel SP become a low level voltage Vl, the first, third and fourth transistors T1, T3 and T4 are turned off and the second, fifth, sixth and seventh transistors T2, T5, T6 and T7 are turned on. Further, the initial voltage Vini becomes a second voltage V2 greater than a first voltage V1.

Accordingly, the initial voltage Vini is applied to the drain electrode and the source electrode of the driving transistor Td so that the drain electrode and the source electrode of the driving transistor Td are pre-charged, and the anode reset voltage Var is applied to the anode of the light emitting diode De so that the anode of the light emitting diode De is reset.

In the OLED display device 110 according to an embodiment of the present disclosure, the initial voltage Vini is applied to the drain electrode and the source electrode of the driving transistor Td during the seventh time period TP7 of the anode reset frame ARF, and the drain electrode and the source electrode of the driving transistor Td are pre-charged with the initial voltage Vini. In addition, the anode reset voltage Var is applied to the anode of the light emitting diode De of the subpixel SP using the selecting unit 150, and the anode of the light emitting diode De is reset.

Since the driving transistor Td is pre-charged and the anode of the light emitting diode De is reset, a driving speed is improved.

Consequently, in the OLED display device 110 according to an embodiment of the present disclosure, since a signal is transmitted from the data driving unit 130 to the subpixel SP or from the subpixel SP to the data driving unit 130 using the selecting unit 150, deterioration of the light emitting diode De and the sampling transistor T1 is compensated.

In addition, since a property of the light emitting diode De and the sampling transistor T1 partially driven is selectively detected and compensated using the selecting unit 150, deterioration such as a stain is minimized and a uniformity of an image is improved.

In the descriptions herein, as an illustrative example, the transistors are described as being turned off by a high logic level voltage on the gate and being turned on by a low logic level voltage on the gate, which does not limit the scope of the disclosure. The techniques of the disclosure may be implemented using various type of transistors, which may be controlled by various mechanisms. For example, an NMOS transistor may be used, which is turned on by a high logic level voltage on the gate or a PMOS transistor, which has been shown, that is turned on by a low logic level and turn off by a high logic level. Further, a current-controlled transistor may also be used to implement the techniques of the disclosure, and is included in the scope of the disclosure.

It will be apparent to those skilled in the art that various modifications and variation can be made in the present disclosure without departing from the scope of the disclosure. Thus, it is intended that the present disclosure cover the modifications and variations of this disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An organic light emitting diode display device, comprising:

a timing controlling circuit for generating an image data, a data control signal and a gate control signal;

a data driving circuit for generating a data voltage based on the image data and the data control signal, the data driving circuit including an output channel for outputting the data voltage and a pre-charge voltage in two different operations, respectively;

a gate driving circuit for generating a first gate voltage, a second gate voltage, a third gate voltage, a first emission voltage and a second emission voltage based on the gate control signal;

a display panel including a subpixel, a gate line, a data line and a reset line, the subpixel including first, second, third, fourth, fifth, sixth, and seventh transistors, a storage capacitor and a light emitting diode, the gate line for transmitting the first gate voltage, the second gate voltage, the third gate voltage, the first emission voltage, and the second emission voltage to the subpixel, and the reset line for transmitting the pre-charge voltage to the subpixel; and a selecting circuit connecting the output channel to one of the data line or the reset line, the selecting circuit including a first mux transistor a second mux transistor and a third mux transistor, the second mux transistor configured to connect the pre-charge voltage to an anode of the light emitting diode through the reset line in a first operation and connect the anode of the light emitting diode to a voltage detecting unit through the reset line in a second operation subsequent to the first operation, the third mux transistor configured to connect the data voltage to the data line in a third operation subsequent to the second operation, and the data line different from the reset line.

2. The display device of claim 1, wherein the data driving circuit includes a first switch connected between the pre-charge voltage and the output channel, an analog-digital converter, and a second switch connected between the output channel and the analog-digital converter.

3. The display device of claim 2, wherein the first mux transistor is connected to an anode reset voltage and the second and third mux transistors are connected to the output channel.

4. The display device of claim 3, wherein the driving transistor is configured to be switched according to a voltage of a first electrode of the storage capacitor and is connected to the first, second, fourth and fifth transistors and the storage capacitor, wherein the first transistor is configured to be switched according to the first gate voltage and is connected to the driving transistor, the fourth and fifth transistors and the storage capacitor, wherein the second transistor is configured to be switched according to the second gate voltage and is connected to the data line, the driving transistor and the third transistor, wherein the third transistor is configured to be switched according to the first emission voltage and is connected to the driving transistor, the second transistor, the storage capacitor and a high level voltage, wherein the fourth transistor is configured to be switched according to the first emission voltage and is connected to the driving transistor and the first, fifth, sixth and seventh transistors, wherein the fifth transistor is configured to be switched according to the third gate voltage and is connected to the driving transistor, the first and fourth transistors and an initial voltage, wherein the sixth transistor is configured to be switched according to the second gate voltage and is connected to the reset line, the fourth and seventh transistors and an anode reset capacitor, and wherein the seventh transistor is configured to be switched according to the second emission voltage and is connected to the fourth and sixth transistors and the light emitting diode.

5. The display device of claim 3, wherein during a first time period of an emission compensation frame, the first switch is configured to be on an on state, and the second switch is configured to be on an off state, the first and third mux transistors are configured to be turned off, and the second mux transistor is configured to be turned on, the second, sixth and seventh transistors are configured to be turned on, and the first, third, fourth and fifth transistors are configured to be turned off, and the anode of the light emitting diode is configured to receive the pre-charge voltage, and wherein during a second time period of the emission compensation frame, the first switch is configured to be on an off state, and the second switch is configured to be on an on state, the first and third mux transistors are configured to be turned off, and the second mux transistor is configured to be turned on, the second, sixth and seventh transistors are configured to be turned on, and the first, third, fourth and fifth transistors are configured to be turned off, and the analog-digital converter is configured to receive a voltage at the anode of the light emitting diode.

6. The display device of claim 3, wherein during a third-first time period of a sampling compensation frame, the first and second switches are each configured to be on an off state, the first and second mux transistors are configured to be turned off, and the third mux transistor is configured to be turned on, the first and fifth transistors are configured to be turned on, and the second, third, fourth, sixth and seventh transistors are configured to be turned off, and a gate electrode of the driving transistor and a first electrode of the storage capacitor are configured to receive an initial voltage, wherein during a second time period of the sampling compensation frame, the first and second switches are each configured to be on the off state, the first and second mux transistors are configured to be turned off, and the third mux transistor is configured to be turned on, the first, second and sixth transistors are configured to be turned on, and the third, fourth, fifth and seventh transistors are configured to be turned off, and the gate electrode of the driving transistor and the first electrode of the storage capacitor are configured to receive the data voltage, and wherein during a third time period of the sampling compensation frame, the first switch is configured to be on the off state and the second switch is configured to be on an on state, the first and third mux transistors are configured to be turned off, and the second mux transistor is configured to be turned on, the second, third, fourth and sixth transistors are configured to be turned on, and the first, fifth and seventh transistors are configured to be turned off, and the analog-digital converter is configured to receive a current of the driving transistor.

7. The display device of claim 3, wherein during a first time period of a driving compensation frame, the first and second switches are each configured to be on an off state, the first and second mux transistors are configured to be turned off, and the third mux transistor is configured to be turned on, the first and fifth transistors are configured to be turned on, and the second, third, fourth, sixth and seventh transistors are configured to be turned off, and a gate electrode of the driving transistor and a first electrode of the storage capacitor are configured to receive an initial voltage, wherein during a second time period of the driving compensation frame, the first and second switches are each configured to be on the off state, the first and second mux transistors are configured to be turned off, and the third mux transistor is configured to be turned on, the first, second and sixth transistors are configured to be turned on, and the third, fourth, fifth and seventh transistors are configured to be turned off, and the gate electrode of the driving transistor and the first electrode of the storage capacitor are configured to receive the data voltage, and wherein during a third time period of the driving compensation frame, the first and second switches are each configured to be on the off state, the first and second mux transistors are configured to be turned off, and the third mux transistor is configured to be turned on, the second, fourth and seventh transistors are configured to be turned on, and the first, second, fifth and sixth transistors are configured to be turned off, and the light emitting diode is configured to receive a current of the driving transistor, and emit a light.

8. The display device of claim 3, wherein during a first time period of an anode reset frame, the first and second switches each are configured to be on an off state, the second and third mux transistors are configured to be turned off, and the first mux transistor is configured to be turned on, the second, fifth, sixth and seventh transistors are configured to be turned on, and the first, third and fourth transistors are configured to be turned off, and an anode of the light emitting diode is configured to receive the anode reset voltage.

9. The display device of claim 1, wherein the first transistor is configured to be switched according to the first gate voltage, the second and sixth transistors are configured to be switched according to the second gate voltage, the third and fourth transistors are configured to be switched according to the first emission voltage, the fifth transistor is configured to be switched according to the third gate voltage, and the seventh transistor is configured to be switched according to the second emission voltage.

10. The display device of claim 1, wherein the first mux transistor is connected between an anode reset voltage and the reset line, the second mux transistor is connected between the output channel and the reset line, and the third mux transistor is connected between the output channel and the data line.

* * * * *